United States Patent
Azeyanagi et al.

(10) Patent No.: US 11,151,519 B2
(45) Date of Patent: Oct. 19, 2021

(54) EVENT REMINDER NOTIFICATION SYSTEM

(71) Applicant: INTERNATIONAL BUSINESS MACHINES CORPORATION, Armonk, NY (US)

(72) Inventors: Miki Azeyanagi; Timothy Waileong Koh, Tokyo (JP); Mayumi Goto, Ayase (JP)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 16/410,503

(22) Filed: May 13, 2019

(65) Prior Publication Data
US 2020/0364674 A1 Nov. 19, 2020

(51) Int. Cl.
*G06Q 10/10* (2012.01)
*H04L 12/58* (2006.01)

(52) U.S. Cl.
CPC ......... *G06Q 10/1095* (2013.01); *H04L 51/24* (2013.01)

(58) Field of Classification Search
None
See application file for complete search history.

(56) References Cited

U.S. PATENT DOCUMENTS

| | | | | |
|---|---|---|---|---|
| 2009/0009340 A1* | 1/2009 | Weaver | .......... | G06Q 10/063114 340/573.1 |
| 2011/0081634 A1* | 4/2011 | Kurata | .......... | G06N 5/02 434/236 |
| 2011/0276396 A1* | 11/2011 | Rathod | .......... | H04L 51/066 705/14.49 |
| 2013/0335219 A1* | 12/2013 | Malkowski | .......... | G08B 13/2491 340/539.22 |
| 2014/0207373 A1* | 7/2014 | Lerenc | .......... | G09B 29/007 701/465 |

(Continued)

FOREIGN PATENT DOCUMENTS

| | | |
|---|---|---|
| JP | 10187625 A | 7/1998 |
| JP | 2010117860 A | 5/2010 |

OTHER PUBLICATIONS

Naomi Gerstel and Dan Clawson, Control over Time: Employers, Workers, and Families Shaping Work Schedules, 2018, Annual Reviews, 77-97. (Year: 2018).*

(Continued)

*Primary Examiner* — Hafiz A Kassim
*Assistant Examiner* — Zahra Elkassabgi
(74) *Attorney, Agent, or Firm* — Robert R. Aragona (57) ABSTRACT

A computer-implemented method for transmitting a reminder notification to a participant for a registered event in a calendar system. The method includes registering an event in a calendar system, wherein the registered event comprises at least a start time and a venue location for the event. The method further includes identifying a current location of a participant for the registered event, or a concentration level of a participant, and determining, dynamically, a time to transmit a reminder notification based on the identified current location of the participant for the registered event, the start time for the event, and the venue location for the event. The method further includes transmitting the reminder notification to the participant for the registered event based on the determination.

16 Claims, 5 Drawing Sheets

(56) References Cited

U.S. PATENT DOCUMENTS

| | | | |
|---|---|---|---|
| 2014/0278071 A1* | 9/2014 | San Filippo | G01C 21/3423 |
| | | | 701/465 |
| 2015/0262430 A1* | 9/2015 | Farrelly | G06Q 30/0284 |
| | | | 705/13 |
| 2016/0379172 A1* | 12/2016 | Song | G06Q 10/1095 |
| | | | 705/7.19 |
| 2017/0126610 A1 | 5/2017 | Sachidanandam et al. | |
| 2018/0188695 A1 | 7/2018 | Kumar et al. | |
| 2018/0240078 A1 | 8/2018 | Goldsmith et al. | |
| 2019/0258944 A1* | 8/2019 | Lee | G06N 20/20 |

OTHER PUBLICATIONS

Healey, Jennifer, Picard Rosalind, Detecting Stress During Real-World Driving Tasks using Physiological Sensors, 2005, IEEE Transactions on Intelligent Transportation Systems, vol. 6, No. 2 (Year: 2005).*

Apple, "Download iOS 9.0—9.3.5 Information," Apple Support, Aug. 25, 2016, p. 1-7, https://support.apple.com/kb/DL1842?locale=en_US, Accessed on May 8, 2019.

Goko, "I did not know unexpectedly! ? Usage summary of Google Now," Team Santa Blog, Jul. 22, 2014, p. 1-6, Google Translate, http://teamsanta.info/benri/1829/, Accessed on May 8, 2019.

Kamei, "Estimation of Degree of Concentration Based on Behavior Analysis in Learning," Chuo University Graduate Research Annual Report, Jul. 1, 2015, 9 Pages.

Mell et al., "The NIST Definition of Cloud Computing," National Institute of Standards and Technology, Sep. 2011, p. 1-3, Special Publication 800-145.

Muramatsu et al., "Effect Verification of Concentration Measurement System that Uses Face Information," Information Processing Society of Japan Proceedings of the 74th Annual Conference, 2012, 5 Pages, English Abstract Only.

Nagai et al., "Correlation Analysis Between Concentration Levels and Quantified PC Operations," The Institute of Image Information and Television Engineers Annual Convention, 2014, 2 Pages, English Abstract Only.

Steadman, "Learn How to Improve Your Brain's Focus with the Mind-Reading Melon," Wired News, May 14, 2013, p. 1-2, https://www.wired.co.uk/news/archive/2013-05/14/melon-headband-brain-analysis, Accessed on May 8, 2019.

Takahashi, "We Also Plan to Move to Google Calendar With iPhone App Sunrise," Always Work Next to IT, Jul. 20, 2015, p. 1-10, https://tonari-it.com/sunrise-root-schedule/, Accessed on May 8, 2019.

Yasui, "We Grasp the 'Degree of Concentration' of Employee with Glasses with Sensor, Corporate Solution Announcement of JINS MEME Utilization," Engadget Japanese, Jan. 20, 2017, p. 1-6, https://japanese.engadget.com/2017/01/20/jins-meme/, Accessed on May 8, 2019.

Yoshida et al., "Emotion Visualizer: Emotion Estimation for Visualization and Application Using Biometric Information," Information Processing Society of Japan Interaction, 2018, p. 322-326, English Abstract Only.

* cited by examiner

EVENT REMINDER NOTIFICATION SYSTEM

BACKGROUND

Embodiments of the invention generally relate to the field of computing and more particularly to data processing and event reminder notifications.

We currently live in a fast-paced world where information is literally at our fingertips from the moment we wake up to the moment we go to sleep. Even with electronic calendars that store our appointments, birthdays, anniversaries, and meetings, we can still miss certain events due to distraction or mere forgetfulness.

Electronic event reminders are a good way to keep our lives on track so that we do not miss important events or meetings. However, even with event reminders, we may be consumed by a current project, or at a location that is too distant to make it on time to the event or meeting. In these scenarios, we may either miss the event or show up late, both of which are not the ideal option.

SUMMARY

Embodiments of the invention include a method, computer program product, and system, for transmitting a reminder notification to a participant for a registered event in a calendar system.

According to an embodiment of the invention, a method for transmitting a reminder notification to a participant for a registered event in a calendar system includes registering an event in a calendar system, wherein the registered event comprises at least a start time and a venue location for the event. The method further includes identifying a current location of a participant for the registered event and determining, dynamically, a time to transmit a reminder notification based on the identified current location of the participant for the registered event, the start time for the event, and the venue location for the event. The method further includes transmitting the reminder notification to the participant for the registered event based on the determination.

A computer program product, according to an embodiment of the invention, for directing a computer processor to implement a program that transmits a reminder notification to a participant for a registered event in a calendar system. The storage device embodies program code that is executable by a processor of a computer to perform a method. The method includes registering an event in a calendar system, wherein the registered event comprises at least a start time and a venue location for the event. The method further includes identifying a current location of a participant for the registered event and determining, dynamically, a time to transmit a reminder notification based on the identified current location of the participant for the registered event, the start time for the event, and the venue location for the event. The method further includes transmitting the reminder notification to the participant for the registered event based on the determination.

According to another embodiment, a system for transmitting a reminder notification to a participant for a registered event in a calendar system, includes one or more computing devices each having one or more processors and one or more tangible storage devices. The one or more storage devices embody a program. The program has a set of program instructions for execution by the one or more processors. The program instructions include instructions for registering an event in a calendar system, wherein the registered event comprises at least a start time and a venue location for the event. The program instructions further include instructions for identifying a current location of a participant for the registered event and determining, dynamically, a time to transmit a reminder notification based on the identified current location of the participant for the registered event, the start time for the event, and the venue location for the event. The program instructions further include instructions for transmitting the reminder notification to the participant for the registered event based on the determination.

DETAILED DESCRIPTION

Electronic event reminders are a good way to keep our lives on track so that we do not miss important events or meetings. However, even with event reminders, we may be consumed by a current project, or at a location that is too distant to make it on time to the event or meeting. In these scenarios, we may either miss the event or show up late, both of which are not the ideal option.

Presently, there is no way for electronic event reminders to determine, dynamically, an optimal time to transmit a reminder notification to a user based on an identified current location of the user, the start time for the scheduled event, and the location of the venue for the scheduled event.

The present invention takes into account the reality of the facts on the ground, per se, and calculates the optimal time to send the event reminder notification to the user so that the user has enough time to get to the scheduled event on time. For example, the present invention may calculate the time necessary for a user, currently in deep concentration at her desk, to wrap up her work, and tack on the additional time to the event reminder notification, which is sent at an appropriate time by an appropriate method. In additional examples, the present invention may also remind the user about items needed for the event (e.g., user's laptop computer, projector, adapter, flash drive, and so forth), and take into consideration the location of the one or more items needed for the event, plus the additional time required for the user to retrieve these items before going to the event venue location.

If a user fails to show up to a confirmed scheduled event, the organizer, or presenter at the event, may be unsure how to proceed with the event, not knowing when the user will arrive. The present disclosure may resolve this indecision since it can provide the organizer with status details of the confirmed participants for the scheduled event.

Hereinafter, exemplary embodiments of the present invention will be described in detail with reference to the attached figures.

The present invention is not limited to the exemplary embodiments below, but may be implemented with various modifications within the scope of the present invention. In addition, the drawings used herein are for purposes of illustration, and may not show actual dimensions.

Figure 1:
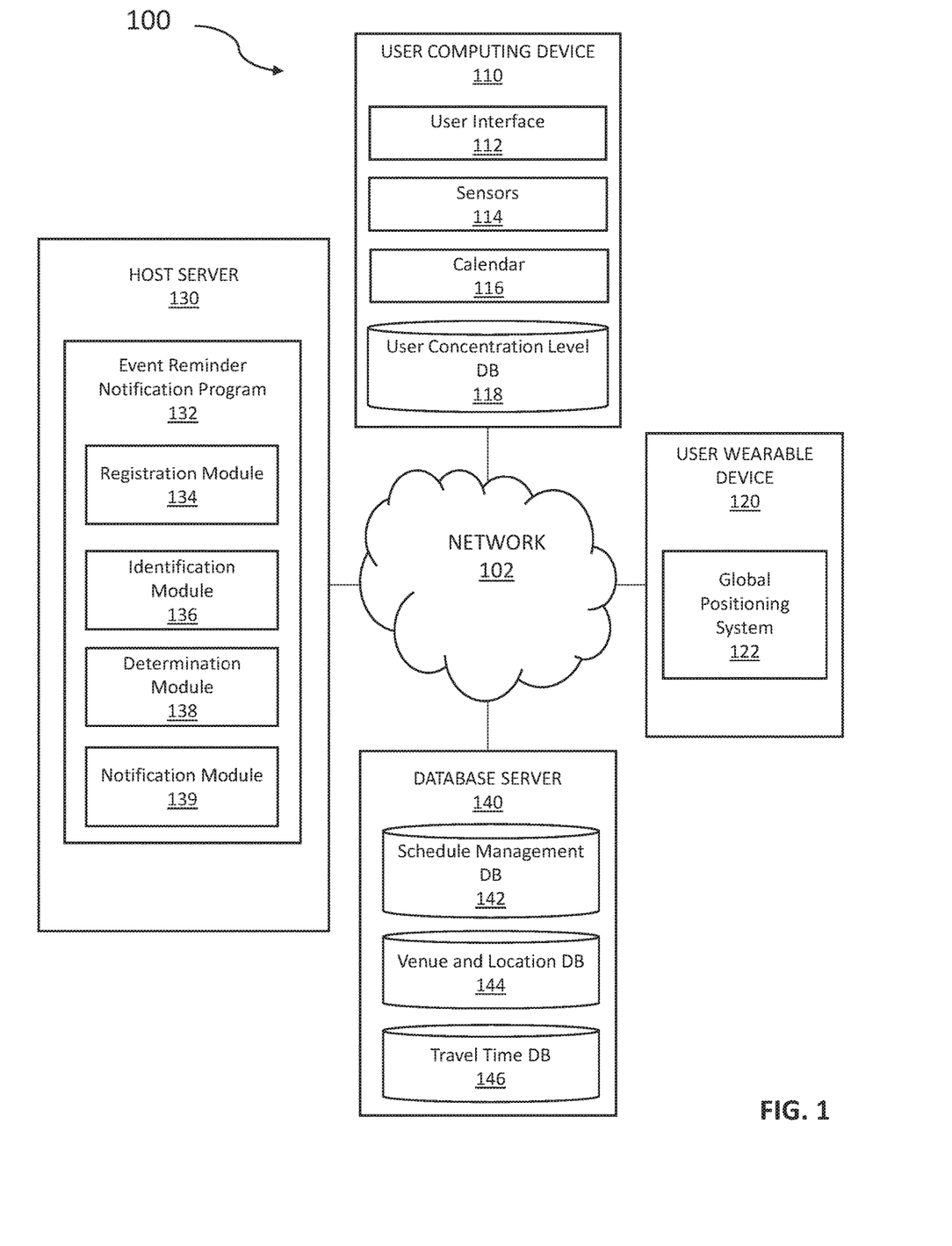
FIG. 1 illustrates event reminder notification computing environment 100, in accordance with an embodiment of the present invention.

FIG. 1 illustrates event reminder notification computing environment 100, in accordance with an embodiment of the present invention. Event reminder notification computing environment 100 includes user computing device 110, user wearable device 120, host server 130, and database server 140 all connected via network 102. The setup in FIG. 1 represents an example embodiment configuration for the present invention, and is not limited to the depicted setup in order to derive benefit from the present invention.

In an exemplary embodiment, user computing device 110 contains user interface 112, sensors 114, calendar 116, and user concentration level database 118. In various embodiments, user computing device 110 may be a laptop computer, tablet computer, netbook computer, personal computer (PC), a desktop computer, a personal digital assistant (PDA), a smart phone, or any programmable electronic device capable of communicating with user wearable device 120, host server 130, and database server 140 via network 102. User computing device 110 may include internal and external hardware components, as depicted and described in further detail below with reference to FIG. 3. In other embodiments, user computing device 110 may be implemented in a cloud computing environment, as described in relation to FIGS. 4 and 5 herein. User computing device 110 may also have wireless connectivity capabilities allowing for communication with user wearable device 120, host server 130, and database server 140 and other computers, devices, or servers over network 102.

In an exemplary embodiment, user computing device 110 includes user interface 112, which is a computer program that allows a user to interact with user computing device 110 and other connected devices via network 102. For example, user interface 112 may be a graphical user interface (GUI). In addition to comprising a computer program, user interface 112 may be connectively coupled to hardware components, such as those depicted in FIG. 3, for receiving user input. In an exemplary embodiment, user interface 112 is implemented via a web browser, however in other embodiments user interface 112 may be implemented via a different program capable of receiving user interaction and communicating with other devices.

In an exemplary embodiment, user computing device 110 includes one or more sensors 114. A sensor 114 may be a device, camera, hardware component, module, or subsystem capable of detecting actions of a user (e.g., typing, looking at screen, not near computer, sleeping, and so forth), and sending the detected data to other electronics (e.g., host server 130), components (e.g., user concentration level database 118), or programs (e.g., event reminder notification program 132) within a system such as event reminder notification computing environment 100. In various embodiments, the detected data collected by sensors 114 may be instrumental in determining an activity status and concentration level of a user (e.g., busy, away, in a meeting, do not disturb, highly focused, asleep, etc.) as known to one of ordinary skill in the art.

For example, existing techniques known to one of ordinary skill in the art may include, but are not limited to, detecting values of a user's posture, heart rate, brain waves, and so forth, using sensors 114.

Sensors 114, in an exemplary embodiment, may be located within user computing device 110 and can include a software application, proximity sensor, camera, microphone, light sensor, infrared sensor, weight sensor, temperature sensor, tactile sensor, motion detector, optical character recognition (OCR) sensor, occupancy sensor, heat sensor, analog sensor (e.g., potentiometers, force-sensing resistors), radar, radio frequency sensor, video camera, digital camera, Internet of Things (IoT) sensors, lasers, gyroscopes, accelerometers, structured light systems, user tracking sensors (e.g., eye, head, hand, and body tracking positions of a user), and other devices used for measuring an environment or current state of the user and/or the physical environment of the user.

In exemplary embodiments, the data collected from sensors 114 may be useful in assisting event reminder notification program 132 to detect an activity status and concentration level of a user within the network. In alternative embodiments, event reminder notification computing environment 100 may include any other systems and methods for collecting and utilizing user state of mind/behavior data within an IoT system, known to one of ordinary skill in the art.

In exemplary embodiments, sensors 114 are capable of continuously monitoring, collecting, and saving collected data on a local storage database, such as user concentration level database 118, or sending the collected data to event reminder notification program 132 for analysis and storage. In alternative embodiments, sensors 114 may be capable of detecting, communicating, pairing, or syncing with IoT devices (e.g., a user's smart phone, wearable device, and so forth), thus creating opportunities for more direct integration of the physical world into computer-based systems, and resulting in improved efficiency, accuracy, and economic benefit in addition to reduced human intervention.

In exemplary embodiments, sensors 114 may be capable of transmitting detected and monitored activity status, location data, and concentration level data of a user to event reminder notification program 132, either on a continuous basis or at set intervals. In other embodiments, sensors 114 may be configured to detect and monitor a user's activity status, location data, and concentration level data based on any method known to one of ordinary skill in the art. In exemplary embodiments, sensors 114 may include an opt-in feature, enabling a user to set preferences (e.g., give or revoke permissions) for detection, monitoring, and storing of a user's privately collected activity status, location data, and concentration level data.

In various embodiments, sensors 114 may be embedded within a user computing device 110 and contain a computer processing unit (CPU), memory, and power resource, and may be capable of communicating with user computing device 110, user wearable device 120, host server 130, and database server 140 over network 102.

In exemplary embodiments, calendar 116 may be a computer program, on computing device 110, that allows a user to electronically enter data for a meeting, conference, or event for a specific date, time, and place. Calendar 116 may include a user's upcoming meetings, conference dates, travelling schedule, and so forth, including times, locations, and venues.

In exemplary embodiments, calendar 116 may also contain a reminder notification that is sent to a user at a specified amount of time prior to a scheduled meeting. For example, if a meeting is scheduled for 11 am, then calendar 116 may include a preference set by the user to send a reminder notification text to the user's smartphone at 10:55 am.

In exemplary embodiments, calendar 116 may be linked to team meeting events, online hosting channels, status messaging tools, and may further be capable of communicating with event reminder notification program 132, user wearable device 120, and database server 140 via network 102.

In exemplary embodiments, user concentration level database 118 stores various concentration levels for each user, together with time required to quit current work (e.g., application, project, etc.). For example, a level of concentration for each user is acquired and analyzed at regular time intervals according to processes known to one of ordinary skill in the art. Such processes may include, but are not limited to, monitoring, via cameras or sensors 114, a user while she is working on her laptop to record posture values, heart rate, brain waves and the like. Additionally, a detected number of keyboard strokes, or operations may indicate concentration levels.

In exemplary embodiments, a user may opt-out of any monitoring of user activity, vitals measurements, and so forth.

In exemplary embodiments, a user can set an event notification reminder to be automatically sent, or not to be sent, when the level of concentration is high. Further, a user can set the expression of the event notification reminder (e.g., sound intensity/size of message/snooze function) according to the level of concentration.

In various embodiments, a status of a messaging tool is automatically changed according to the level of concentration of the user, for example, the status is changed to "Response Impossible", or the like, when the level of concentration is high. Likewise, a notification may be automatically sent to the user when the level of concentration is detected to have decreased.

With continued reference to FIG. 1, user wearable device 120 includes global positioning system (GPS) 122, and may be a wearable device, laptop computer, tablet computer, netbook computer, personal computer (PC), a desktop computer, a personal digital assistant (PDA), a smart phone, a server, or any programmable electronic device capable of communicating with user computing device 110, host server 130, and database server 140, via network 102. User wearable device 120 may be implemented in a cloud computing environment, as described in relation to FIGS. 4 and 5, herein. User wearable device 120 may also have wireless connectivity capabilities allowing it to communicate with user computing device 110, host server 130, and database server 140, and other computers or servers over network 102.

In exemplary embodiments, GPS 122 is a computer program on user computing device 110 that provides time and location information for a user. Modern GPS systems operate on the concept of time and location. In modern GPS systems, four or more satellites broadcast a continuous signal detailing satellite identification information, time of transmission (TOT), and the precise location of the satellite at the time of transmission. When a GPS receiver picks up the signal, it determines the difference in time between the time of transmission (TOT) and the time of arrival (TOA). Based on the amount of time it took to receive the signals and the precise locations of the satellites when the signals were sent, GPS receivers are capable of determining the location where the signals were received. In the exemplary embodiment, GPS 122 is capable of providing real-time location detection of the user, together with an estimated time of arrival for a given destination based on real-time traffic, weather conditions, and so forth.

In various embodiments, GPS 122 may provide alternate routes to reach a destination, or provide re-routed information in the event a user needs to make a stop prior to reaching the final destination.

In an exemplary embodiment, GPS 122 is located on user wearable device 120, which may be a user's wearable device, smart phone, or any other computing device that is connected to, or travels with the user.

With continued reference to FIG. 1, host server 130 includes event reminder notification program 132, and may be a laptop computer, tablet computer, netbook computer, personal computer (PC), a desktop computer, a personal digital assistant (PDA), a smart phone, a server, or any programmable electronic device capable of communicating with user computing device 110, user wearable device 120, and database server 140, via network 102. Event reminder notification program 132 may be implemented in a cloud computing environment, as described in relation to FIGS. 4 and 5, herein. Event reminder notification program 132 may also have wireless connectivity capabilities allowing it to communicate with user computing device 110, user wearable device 120, database server 140, and other computers or servers over network 102. While host server 130 is shown as a single device, in other embodiments, host server 130 may be comprised of a cluster or plurality of computing devices, working together or working separately.

The functional modules of event reminder notification program 132 include registration module 134, identification module 136, determination module 138, and notification module 139.

In exemplary embodiments, database server 140 includes schedule management database 142, venue and location database 144, travel time database 146, and may be a laptop computer, tablet computer, netbook computer, personal computer (PC), a desktop computer, a personal digital assistant (PDA), a smart phone, a server, or any programmable electronic device capable of communicating with user computing device 110, user wearable device 120, and host server 130, via network 102. While database server 140 is shown as a single device, in other embodiments, database server 140 may be comprised of a cluster or plurality of computing devices, working together or working separately.

In exemplary embodiments, schedule management database 142 contains one or more scheduled meetings for a user that may include information about the one or more scheduled meetings synced with the user's calendar 116. For example, schedule management database 142 may include information such as the time for a scheduled meeting (e.g., meeting scheduled for 1 pm); whether a reminder is to be sent to user (e.g., reminder to be sent 5 minutes prior to the meeting); location of the meeting (e.g., meeting in conference room A on the 11$^{th}$ floor); and whether user needs to bring anything to the scheduled meeting (e.g., laptop computer, adapter, projector, documents, etc.). The information about the one or more scheduled meetings may be stored as a data object in schedule management database 142, such as: <meeting_1 pm; reminder_5 mins; location_confA, 11Fl; required_laptop>.

In exemplary embodiments, the information in schedule management database 142 may be organized according to date, time, venue location, required items for meeting, or any other category or organization deemed most useful for the invention to be utilized.

In exemplary embodiments, venue and location database 144 contains coordinates for specific locations of one or more scheduled meetings for a user (e.g., conference room A is located on the 11$^{th}$ floor of 123 Adams St) and are stored as data objects, such as <confA_11Fl; 123_Adams>. In alternative embodiments, venue and location database 144 may store a history of a user's location of past, present, and future scheduled meetings.

In exemplary embodiments, travel time database 146 contains average walking time for a user (e.g., 80 m/min), based on historical tracking. Travel time database 146 may additionally contain time required for an elevator to go up a select number of floors in a building (e.g., 3 minutes to go up one floor; 5 minutes to go up 5 floors, etc.). In alternative embodiments, travel time database 146 may further store other travel data in any organization deemed most useful for the invention to be utilized.

In alternative embodiments, schedule management database 142, venue and location database 144, and travel time database 146 may be capable of being stored on user wearable device 120, host server 130, or user computing device 110 as separate databases.

Figure 2:
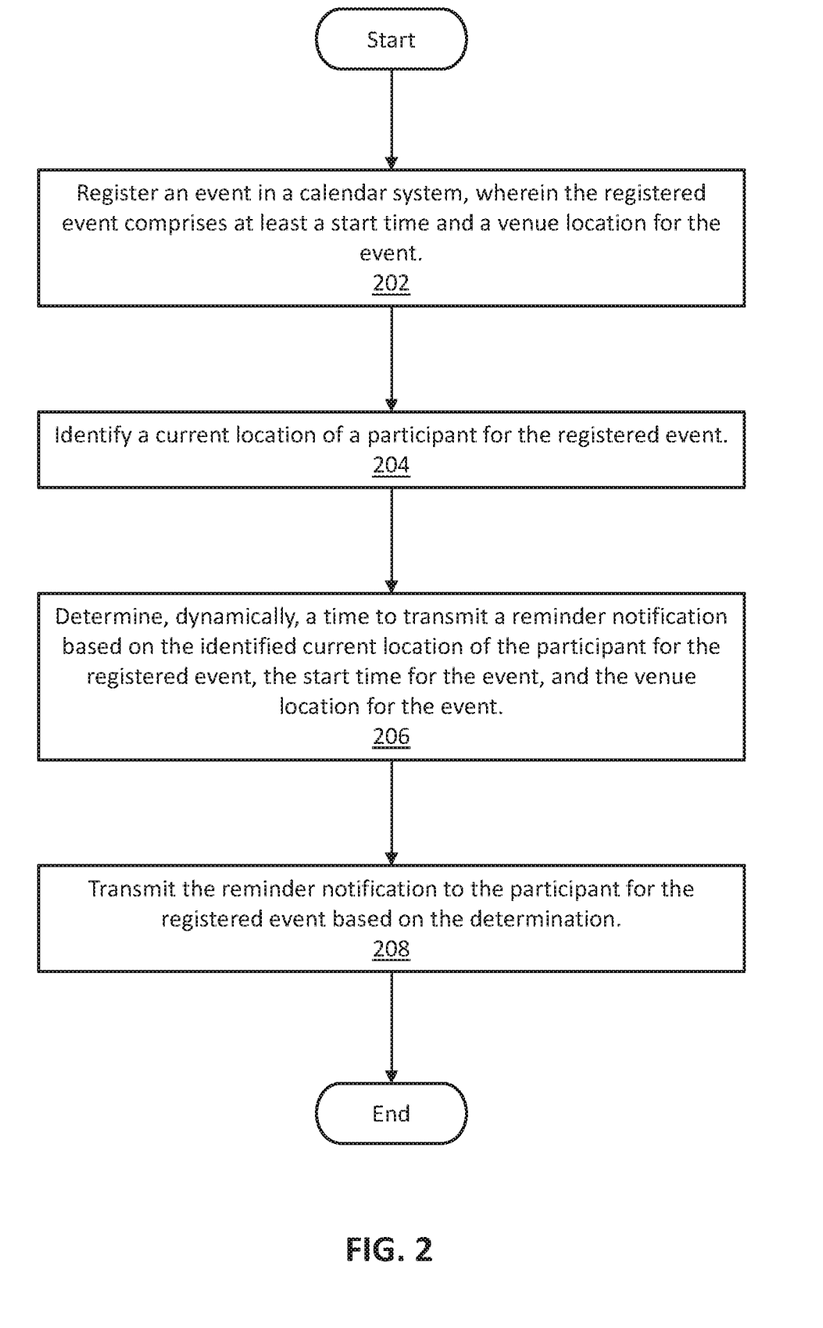
FIG. 2 is a flowchart illustrating the operation of event reminder notification program 132, in accordance with an embodiment of the present invention.

FIG. 2 is a flowchart illustrating the operation of event reminder notification program 132, in accordance with an embodiment of the present invention.

With reference to FIGS. 1 and 2, registration module 134 includes a set of programming instructions in event reminder notification program 132 to register an event in a calendar system, wherein the registered event comprises at least a start time and a venue location for the event (step 202). The set of programming instructions is executable by a processor.

In exemplary embodiments, an event may include a conference, an appointment, a meeting (online or in-person), and so forth. In exemplary embodiments, a calendar system may include calendar 116, which is an electronic calendar system that stores information pertaining to a registered event, such as the date, the time, and the location. The registered event in the calendar system may further include information regarding content of the event, such as notations indicating any items that a user is required to bring to the meeting (e.g., laptop, slideshow, documents, and so forth).

With reference to an illustrative example, Ruby has received a work email containing an invitation for an all-hands online web-conference meeting on Monday, April 15$^{th}$ from 1:30 pm-3 pm. Ruby's colleagues have decided that they will meet in conference room A, on the 11$^{th}$ floor, and everyone will bring their laptop computers in order to join the online conference. The administrator for the online meeting has requested that all invitees confirm their appearances for the meeting. Ruby has confirmed that she will be present.

With continued reference to FIGS. 1 and 2, identification module 136 includes a set of programming instructions in event reminder notification program 132, to identify a current location of a participant for the registered event (step 204). The set of programming instructions is executable by a processor.

In exemplary embodiments, event reminder notification program 132 may be programmed by the user, or via a third-party, to send a reminder notification to the registered user for the event, via a text message, an email, an instant message on the user's laptop, etc. at a pre-determined time prior to the registered event (e.g., 5 minutes prior to the start of the registered event). However, the 5 minute reminder notification may not provide enough time for the user to get to the location of the scheduled event, for example, if the user is in the cafeteria, stuck in traffic, or otherwise delayed.

In exemplary embodiments, identification module 136 serves the purpose of locating the user (in order to determine if the 5 minute reminder notification is sufficient notice for the user to be reminded of the event, and still make it to the registered event on time). In exemplary embodiments, identification module 136 may locate the user (or participant) via GPS 122 on the user's wearable device 120. In other embodiments, a location of the user may be established via cameras or sensors 114 located on user's computing device 110.

With reference to an illustrative example, identification module 136 has identified that Ruby is in the cafeteria, located on the 5$^{th}$ floor of her office building, eating lunch. Ruby was located by identification module 136 over network 102 via the GPS 122 on her wearable device 120. Ruby's all-hands online web-conference meeting begins in 20 minutes, at 1:30 pm, and Ruby typically takes an hour to eat her lunch and relax. Ruby completely forgot about her meeting and is at risk of missing the meeting or showing up late.

With continued reference to FIGS. 1 and 2, determination module 138 includes a set of programming instructions in event reminder notification program 132, to determine, dynamically, a time to transmit a reminder notification based on the identified current location of the participant for the registered event, the start time for the event, and the venue location for the event (step 206). The set of programming instructions is executable by a processor.

In exemplary embodiments, determination module 138 may access database server 140 to retrieve the schedule of a user in schedule management database 142 (e.g., date and time of one or more meetings); to retrieve the location of the meeting of a user in venue and location database 144; and to retrieve travel time required, in travel time database 146, for the user to timely arrive at the scheduled meeting location based on the user's identified current location.

In exemplary embodiments, determination module 138 is capable of computing a predicted travel time, for the participant, to reach the venue location for the registered event based on a current location of the participant for the registered event, and dynamically determining the time to transmit the reminder notification based on the predicted travel time and the start time for the event.

In exemplary embodiments, determination module 138 may also take into consideration the time required for a user to make a stop at their office, or another location, prior to reaching the venue location for the registered event (e.g., to retrieve a laptop computer, or other item needed for the scheduled meeting).

For example, determination module 138 may identify an item necessary for the registered event based on the information contained within the registered event in the calendar system and identify a location of the item necessary for the registered event (e.g., in user's office, in the library, in another conference room, etc.). Determination module 138 computes the predicted travel time required to retrieve the item necessary for the registered event in addition to the predicted travel time required to reach the venue location for the registered event, based on a current location of the participant for the registered event.

Referring back to the illustrative example above, determination module 138 performs a computation to determine, dynamically, the time to transmit a reminder notification to Ruby based on her current location in the cafeteria on the 5$^{th}$ floor, the start of her online scheduled meeting at 1:30 pm, and the time required for Ruby to get to conference room A on the 11$^{th}$ floor, while first stopping at her office on the 10$^{th}$ floor to retrieve her laptop. By accessing database server 140 to retrieve critical information to make multiple calculations, determination module 138 determines that Ruby must go up 5 floors (via elevator) to get to her office on the $10^{th}$ floor, which will take five minutes. Additionally, Ruby must walk 50 m to get to her desk in her office to retrieve her laptop (50 m/80 m per min), then Ruby must go up 1 floor (via elevator) to get to the $11^{th}$ floor (3 min), and walk 30 m to get to conference room A for the scheduled meeting at 1:30 pm (30 m/80 m per min). Determination module 138 determines that 9 minutes must be added to the registered 5 minute event reminder notification, in order to account for Ruby's travel time. As such, the event reminder notification must be sent to Ruby 14 minutes prior to the scheduled meeting.

In alternative embodiments, determining a time to transmit a reminder notification is based on a level of concentration of the participant. For example, the participant may be in their office diligently working on a project and a notification for a scheduled meeting may be ignored if the participant is too involved in their work.

In various embodiments, event reminder notification program 132 may detect the level of concentration of the participant, via one or more sensors (e.g., sensors 114) at regular time intervals and register an amount of time required for the participant to quit work, based on the detected level of concentration of the participant, in a separate database (e.g., user concentration level database 118).

In exemplary embodiments, event reminder notification program 132 may compute an amount of time required for the participant to quit current work, based on the level of concentration of the participant, and compute a second amount of time required for the participant to reach the venue location for the registered event based on a current location of the participant for the registered event. Event reminder notification program 132 can determine, dynamically, the time to transmit the reminder notification to the participant based on the computed amount of time for the participant to quit current work, the computed second amount of time required for the participant to reach the venue location for the registered event based on the current location of the participant, and the start time for the event.

In alternative embodiments, a status of a messaging tool of the participant is automatically changed according to the detected level of concentration of the participant.

With continued reference to FIGS. 1 and 2, notification module 139 includes a set of programming instructions in event reminder notification program 132, to transmit the reminder notification to the participant for the registered event based on the determination (step 208). The set of programming instructions is executable by a processor.

In exemplary embodiments, notification module 139 transmits the event reminder notification to the user's wearable device 120 via network 102. In other embodiments, the event reminder may be transmitted to user's computing device (e.g., laptop, smart phone, etc.) via network 102.

In exemplary embodiments, event reminder notification program 132 determines an effective reminder notification to send to the participant based on the participant's location, level of concentration on current work, or based on some other circumstance of the participant.

With continued reference to the illustrative example above, notification module 139 sends an electronic message, 14 minutes prior to the 1:30 pm meeting start time, to Ruby's wearable device 120 reminding her about the all-hands online web-conference meeting on the $11^{th}$ floor in conference room A, and that Ruby needs to first stop at her office on the $10^{th}$ floor to retrieve her laptop.

In other embodiments, notification module 139 is capable of sending a notification to an organizer of a scheduled event detailing the status (e.g., travel times, current locations) of the participants that confirmed attendance at the scheduled event.

In an exemplary embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between user computing device 110, user wearable device 120, host server 130, and database server 140.

Figure 3:
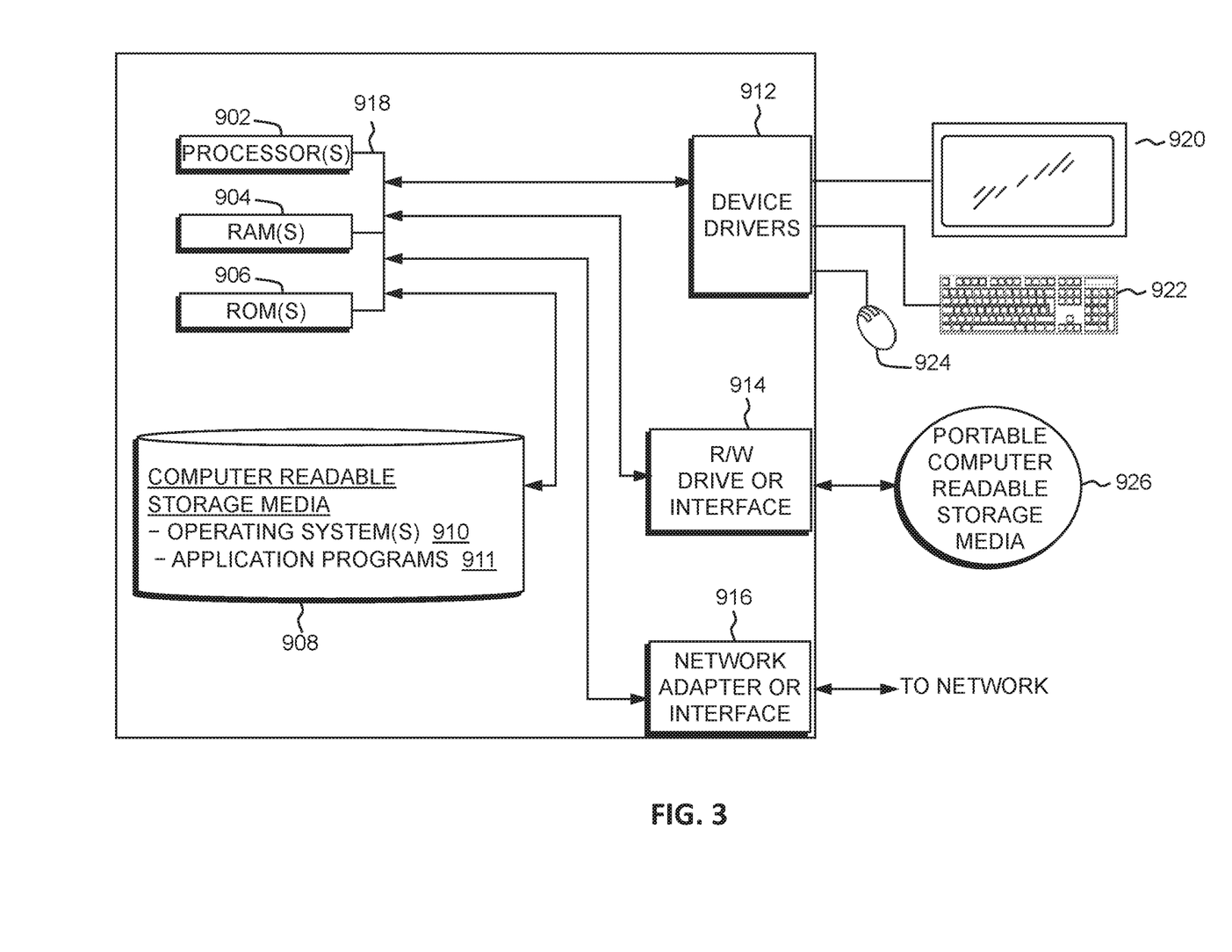
FIG. 3 is a diagram graphically illustrating the hardware components of event reminder notification computing environment 100 of FIG. 1, in accordance with an embodiment of the present invention.

FIG. 3 is a diagram graphically illustrating the hardware components of a computing device in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device of FIG. 3 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as event reminder notification program 132, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 3 may also include a R/W drive or interface 914 to read from and write to one or more portable computer readable storage media 926. Application programs 911 on the computing device may be stored on one or more of the portable computer readable storage media 926, read via the respective R/W drive or interface 914 and loaded into the respective computer readable storage media 908.

Computing device of FIG. 3 may also include a network adapter or interface 916, such as a TCP/IP adapter card or wireless communication adapter (such as a 4G wireless communication adapter using OFDMA technology). Application programs 911 on the computing device may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 3 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
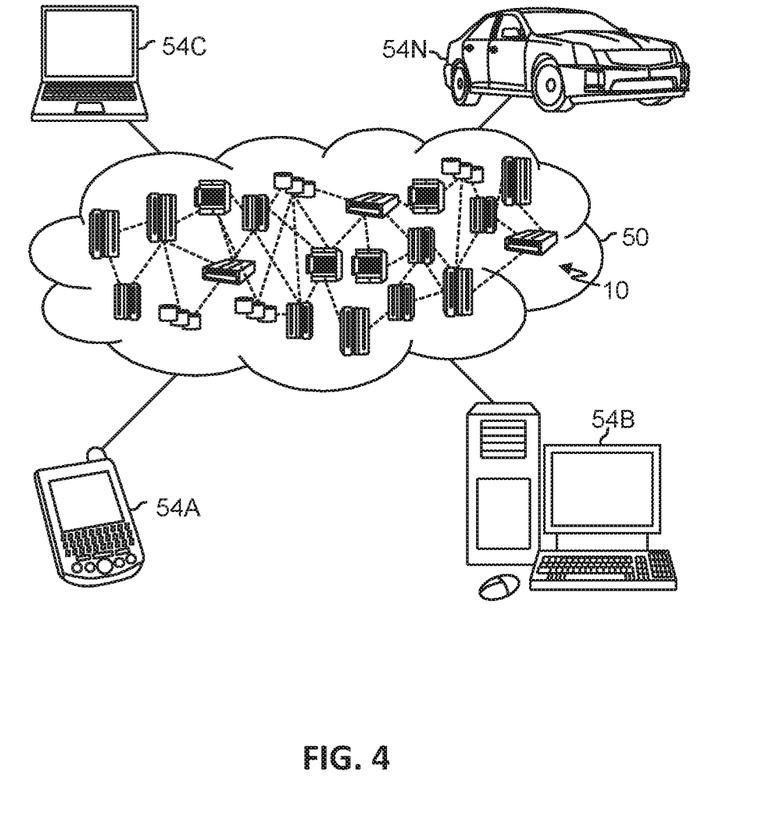
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
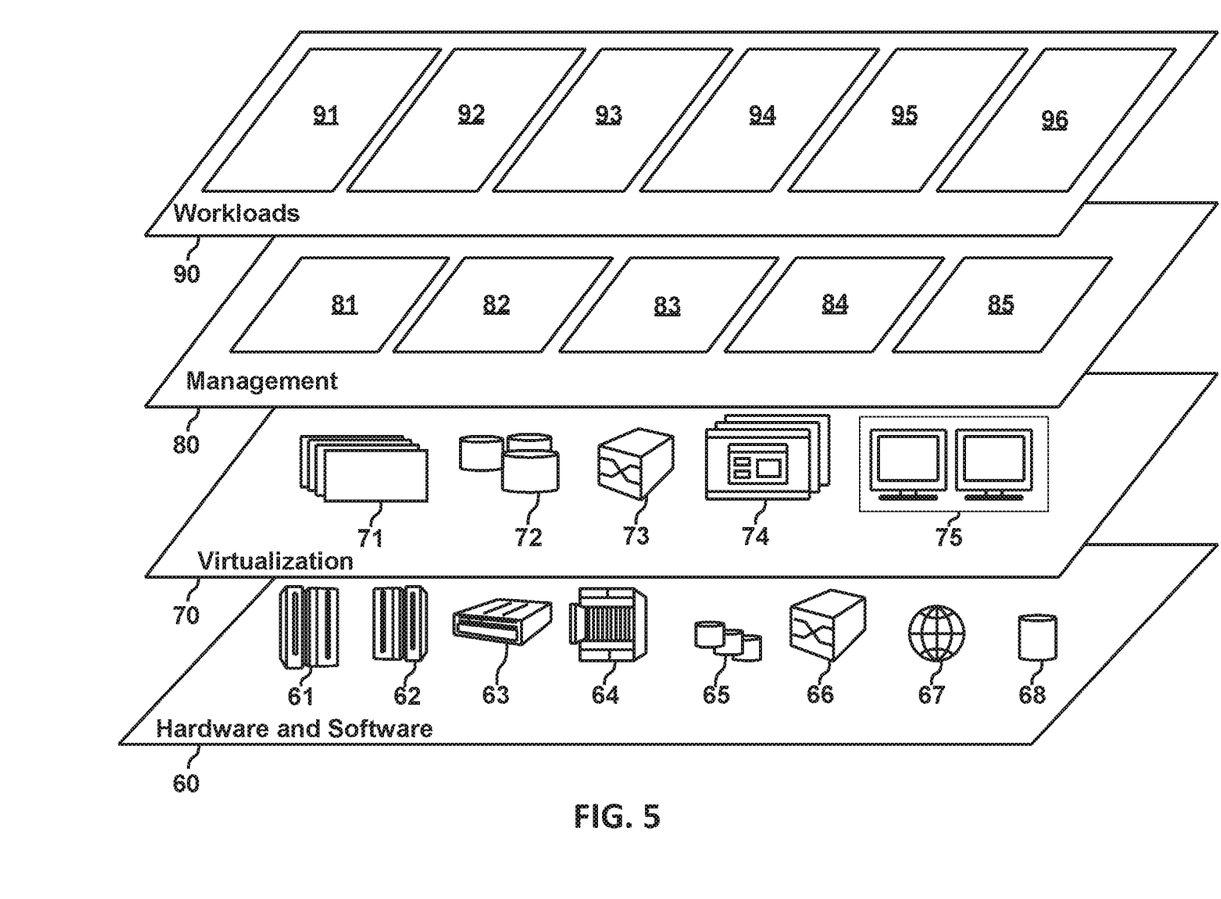
FIG. 5 depicts abstraction model layers of the illustrative cloud computing environment of FIG. 4, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analytics services 96, including those described in connection with FIGS. 1-5.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method for transmitting a reminder notification to a participant for a registered event in a calendar system, comprising:
   registering an event in an electronic calendar system, wherein the registered event comprises at least a start time and a venue location for the event;
   identifying, via GPS on a wearable device of a participant, a current location of the participant for the registered event, wherein the wearable device receives a continuous signal from a plurality of satellites to estimate a time of arrival of the participant at the registered event;
   detecting at least a level of concentration of the participant via one or more sensors at regular time intervals prior to the registered event, wherein the one or more sensors are configured to detect the level of concentration of the participant, an activity status of the participant, and location data of the participant, the one or more sensors capable of communicating with the wearable device;
   computing an amount of time for the participant to quit current work, based on the level of concentration of the participant;
   computing a second amount of time required for the participant to reach the venue location for the registered event based on the current location of the participant for the registered event;
   determining, dynamically, a time to transmit a reminder notification based on the start time for the event, the venue location for the event, the computed amount of time for the participant to quit current work, and the computed second amount of time required for the participant to reach the venue location for the registered event; and
   transmitting the reminder notification to the participant for the registered event based on the determination.

2. The computer-implemented method of claim 1, wherein the registered event in the electronic calendar system further includes information regarding content of the event, and wherein computing the second amount of time further comprises:
   identifying an item necessary for the registered event based on the information contained within the registered event in the electronic calendar system;
   identifying a location of the item necessary for the registered event; and
   computing a travel time required to retrieve the item necessary for the registered event in addition to the computed second amount of time required to reach the venue location for the registered event, based on a current location of the participant for the registered event.

3. The computer-implemented method of claim 1, further comprising:
   transmitting status details, to an organizer for the registered event, for the computed second amount of time of the participant to reach the venue location for the registered event.

4. The computer-implemented method of claim 1, further comprising:

registering an amount of time required for the participant to quit current work, based on the detected level of concentration of the participant, in a separate database.

5. The computer-implemented method of claim 4, wherein a status of a messaging tool of the participant is automatically changed according to the detected level of concentration of the participant.

6. The computer implemented method of claim 1, further comprising:
determining content of a reminder notification to send to the participant based on the detected level of concentration of the participant.

7. A computer system, comprising:
one or more computer devices each having one or more processors and one or more non-transitory tangible storage devices; and
a program embodied on at least one of the one or more storage devices, the program having a plurality of program instructions for execution by the one or more processors, the program instructions comprising instructions for:
registering an event in an electronic calendar system, wherein the registered event comprises at least a start time and a venue location for the event;
identifying, via GPS on a wearable device of a participant, a current location of the participant for the registered event, wherein the wearable device receives a continuous signal from a plurality of satellites to estimate a time of arrival of the participant at the registered event;
detecting at least a level of concentration of the participant via one or more sensors at regular time intervals prior to the registered event, wherein the one or more sensors are configured to detect the level of concentration of the participant, an activity status of the participant, and location data of the participant, the one or more sensors capable of communicating with the wearable device;
computing an amount of time for the participant to quit current work, based on the level of concentration of the participant computing a second amount of time required for the participant to reach the venue location for the registered event based on the current location of the participant for the registered event;
determining, dynamically, a time to transmit a reminder notification based on the start time for the event, the venue location for the event, the computed amount of time for the participant to quit current work, and the computed second amount of time required for the participant to reach the venue location for the registered event; and
transmitting the reminder notification to the participant for the registered event based on the determination.

8. A computer program product, comprising a non-transitory tangible storage device having program code embodied therewith, the program code executable by a processor of a computer to perform a method, the method comprising:
registering an event in an electronic calendar system, wherein the registered event comprises at least a start time and a venue location for the event;
identifying, via GPS on a wearable device of a participant, a current location of the participant for the registered event, wherein the wearable device receives a continuous signal from a plurality of satellites to estimate a time of arrival of the participant at the registered event;
detecting at least a level of concentration of the participant via one or more sensors at regular time intervals prior to the registered event, wherein the one or more sensors are configured to detect the level of concentration of the participant, an activity status of the participant, and location data of the participant, the one or more sensors capable of communicating with the wearable device;
computing an amount of time for the participant to quit current work, based on the level of concentration of the participant computing a second amount of time required for the participant to reach the venue location for the registered event based on the current location of the participant for the registered event;
determining, dynamically, a time to transmit a reminder notification based on the start time for the event, the venue location for the event, the computed amount of time for the participant to quit current work, and the computed second amount of time required for the participant to reach the venue location for the registered event; and
transmitting the reminder notification to the participant for the registered event based on the determination.

9. The computer program product of claim 8, wherein the registered event in the electronic calendar system further includes information regarding content of the event, and wherein computing the second amount of time further comprises:
identifying an item necessary for the registered event based on the information contained within the registered event in the electronic calendar system;
identifying a location of the item necessary for the registered event; and
computing a travel time required to retrieve the item necessary for the registered event in addition to the computed second amount of time required to reach the venue location for the registered event, based on a current location of the participant for the registered event.

10. The computer program product of claim 8, further comprising:
transmitting status details, to an organizer for the registered event, for the computed second amount of time of the participant to reach the venue location for the registered event.

11. The computer program product of claim 8, further comprising:
registering an amount of time required for the participant to quit current work, based on the detected level of concentration of the participant, in a separate database.

12. The computer system of claim 7, further comprising:
transmitting status details, to an organizer for the registered event, for the computed second amount of time of the participant to reach the venue location for the registered event.

13. The computer system of claim 7, wherein the registered event in the electronic calendar system further includes information regarding content of the event, and wherein computing the second amount of time further comprises:
identifying an item necessary for the registered event based on the information contained within the registered event in the electronic calendar system;
identifying a location of the item necessary for the registered event; and
computing a travel time required to retrieve the item necessary for the registered event in addition to the computed second amount of time required to reach the venue location for the registered event, based on a current location of the participant for the registered event.

14. The computer system of claim 7, further comprising:
registering an amount of time required for the participant to quit current work, based on the detected level of concentration of the participant, in a separate database.

15. The computer system of claim 14, wherein a status of a messaging tool of the participant is automatically changed according to the detected level of concentration of the participant.

16. The computer system of claim 7, further comprising:
determining content of a reminder notification to send to the participant based on the detected level of concentration of the participant.

\* \* \* \* \*